US010013873B2

(12) United States Patent
Shan

(10) Patent No.: US 10,013,873 B2
(45) Date of Patent: Jul. 3, 2018

(54) CONNECTING SPLIT HVAC SYSTEMS TO THE INTERNET AND/OR SMART UTILITY METERS

(75) Inventor: Ping Shan, Suzhou (CN)

(73) Assignee: Emerson Electric Co., St. Louis, MO (US)

( * ) Notice: Subject to any disclaimer, the term of this patent is extended or adjusted under 35 U.S.C. 154(b) by 734 days.

(21) Appl. No.: 13/548,552

(22) Filed: Jul. 13, 2012

(65) Prior Publication Data

US 2013/0334326 A1 Dec. 19, 2013

(30) Foreign Application Priority Data

Jun. 15, 2012 (CN) .......................... 2012 1 0202574

(51) Int. Cl.
*G05D 23/00* (2006.01)
*G08C 17/02* (2006.01)
(Continued)

(52) U.S. Cl.
CPC ............. *G08C 17/02* (2013.01); *G08C 23/04* (2013.01); *F24F 11/56* (2018.01); *F24F 11/58* (2018.01)

(58) Field of Classification Search
CPC ...... F24F 2011/0068; F24F 2011/0071; G08C 23/04; G08C 17/02; F25D 17/06; F25D 16/00
(Continued)

(56) References Cited

U.S. PATENT DOCUMENTS 4,948,045 A 8/1990 Romano
5,815,086 A * 9/1998 Ivie .................... H02J 13/0086 307/38

(Continued)

FOREIGN PATENT DOCUMENTS

CN 1506635 6/2004
EP 1947543 A1 7/2008

(Continued)

OTHER PUBLICATIONS

Extended European Search Report for European Patent Application No. 13171504.7 which claims the same priority as the instant application, dated Sep. 4, 2013; 9 pgs.

(Continued)

*Primary Examiner* — Kun Kai Ma
(74) *Attorney, Agent, or Firm* — Harness, Dickey & Pierce, P.L.C.

(57) ABSTRACT

Disclosed are exemplary embodiments of systems and methods for connecting split HVAC systems (and/or for providing such connectivity) to networks and/or smart meters, thereby allowing a split HVAC system to be controllable via the Internet and/or a smart meter. An exemplary embodiment includes a system for use with a split HVAC system having at least one outdoor unit and at least one indoor unit having a receiver. In this exemplary embodiment, the system comprises a control having connectivity to a network and/or a smart utility meter. An equipment interface module is configured for wireless communication with the receiver of the at least one indoor unit and the control. The equipment interface module is operable for communicating instructions from the control to the receiver of the at least one indoor unit, thereby allowing operation of the at least one indoor unit to be controllable via the network and/or smart utility meter.

20 Claims, 2 Drawing Sheets

(51) Int. Cl.

| | |
|---|---|
| ***G08C 23/04*** | (2006.01) |
| *F24F 11/56* | (2018.01) |
| *F24F 11/58* | (2018.01) |

(58) Field of Classification Search

USPC .......... 236/51; 340/870.16, 870.17; 700/276, 700/278

See application file for complete search history.

(56) References Cited

U.S. PATENT DOCUMENTS

| | | | |
|---|---|---|---|
| 7,739,882 | B2 | 6/2010 | Evans et al. |
| 7,778,262 | B2 | 8/2010 | Beagley et al. |
| 2001/0022089 | A1 * | 9/2001 | Wada .............................. 236/51 |
| 2002/0154026 | A1 * | 10/2002 | Niizato ................ F24F 11/0086 340/12.22 |
| 2003/0000233 | A1 | 1/2003 | Mazereeuw |
| 2004/0183722 | A1 | 9/2004 | Ueda et al. |
| 2004/0204793 | A1 | 10/2004 | Yoon et al. |
| 2005/0269419 | A1 * | 12/2005 | Neranjan ........... G05D 23/1905 236/51 |
| 2006/0033636 | A1 | 2/2006 | Kwong et al. |
| 2006/0138225 | A1 * | 6/2006 | Richley .............. G06K 7/10009 235/385 |
| 2007/0114295 | A1 * | 5/2007 | Jenkins ........................... 236/51 |
| 2009/0140059 | A1 * | 6/2009 | Barton et al. ................... 236/51 |
| 2009/0212925 | A1 * | 8/2009 | Schuman, Sr. ........ G08B 5/222 340/286.07 |
| 2010/0006660 | A1 * | 1/2010 | Leen .................. G05D 23/1931 236/51 |
| 2010/0245094 | A1 | 9/2010 | Tan |
| 2010/0307733 | A1 | 12/2010 | Karamanos et al. |
| 2011/0005261 | A1 * | 1/2011 | Lee ........................... A61L 9/22 62/331 |
| 2012/0012764 | A1 * | 1/2012 | Tuchman ............... G02B 5/208 250/515.1 |
| 2012/0022703 | A1 * | 1/2012 | Yeo ........................ F24F 11/006 700/277 |
| 2012/0023977 | A1 * | 2/2012 | Kim et al. ......................... 62/89 |
| 2012/0067560 | A1 * | 3/2012 | Bergman et al. ............. 165/238 |
| 2012/0067561 | A1 | 3/2012 | Bergman et al. |
| 2012/0253521 | A1 * | 10/2012 | Storm et al. .................. 700/276 |

FOREIGN PATENT DOCUMENTS

| | | | | |
|---|---|---|---|---|
| JP | 10246497 | A | * | 9/1998 |
| JP | 10-336762 | | | 12/1998 |
| JP | 11-118225 | | | 4/1999 |
| JP | 11118225 | A | * | 4/1999 |
| WO | WO2010/031012 | | | 3/2010 |

OTHER PUBLICATIONS

Chinese Office Action issued in Chinese Patent of Invention Application No. 201210202574.8 which the instant application claims priority to, dated Jul. 21, 2015; 8 pgs.

* cited by examiner

CONNECTING SPLIT HVAC SYSTEMS TO THE INTERNET AND/OR SMART UTILITY METERS

CROSS-REFERENCE TO RELATED APPLICATION

This application claims the benefit and priority of Chinese Patent of Invention Application No. 201210202574.8, filed Jun. 15, 2012. The entire disclosure of the above application is incorporated herein by reference.

FIELD

The present disclosure relates to systems and methods for connecting split HVAC systems (and/or for providing such connectivity) to the Internet and/or smart meters, thereby allowing a split HVAC system to be controllable via the Internet and/or a smart meter.

BACKGROUND

This section provides background information related to the present disclosure which is not necessarily prior art.

A common type of heating, ventilation, and air conditioning (HVAC) system is a multi-split HVAC system, which may also be generally referred to as a ductless system. A typical multi-split HVAC system includes indoor and outdoor units and a programmable thermostat. The thermostat may be external to and remotely located from the indoor and outdoor units.

Another type of HVAC system includes single-split wall-mounted air conditioners, which are commonly used in Asian. This example air conditioner includes an outdoor unit split from the indoor unit. The outside unit includes the compressor and is located outside the room. The indoor unit or air handler includes the evaporator and is located in the room.

SUMMARY

This section provides a general summary of the disclosure, and is not a comprehensive disclosure of its full scope or all of its features.

Disclosed are exemplary embodiments of systems and methods for connecting split HVAC systems (and/or for providing such connectivity) to networks and/or smart meters, thereby allowing a split HVAC system to be controllable via the Internet and/or a smart meter. An exemplary embodiment includes a system for use with a split HVAC system having at least one outdoor unit and at least one indoor unit having a receiver. In this exemplary embodiment, the system comprises a control having connectivity to a network and/or a smart utility meter. An equipment interface module is configured for wireless communication with the receiver of the at least one indoor unit and the control. The equipment interface module is operable for communicating instructions from the control to the receiver of the at least one indoor unit, thereby allowing operation of the at least one indoor unit to be controllable via the network and/or smart utility meter.

In another exemplary embodiment, a multi-split HVAC system generally includes a zone control, at least one outdoor unit, a plurality of indoor units each having an infrared receiver, and a plurality of radio frequency transceivers. Each radio frequency transceiver is configured for communication with the zone control via radio frequency signals and for communication with a corresponding one of the infrared receivers via infrared signals. The radio frequency transceivers are operable for communicating instructions from the zone control to the receivers, thereby allowing operation of all of the indoor units to be controllable by the zone control.

Another exemplary embodiment includes methods for wirelessly, remotely controlling split HVAC systems having at least one outdoor unit and at least one indoor unit. In an exemplary embodiment, a method generally includes remotely setting an instruction for the at least one indoor unit via a network, a smart meter, or a zone control. This example method also wirelessly transmits the instruction to an equipment interface module that converts the instruction to a command for the at least one indoor unit. This example method further includes wirelessly transmitting the command to a receiver of the at least one indoor unit, whereby operation of the at least one indoor unit may be controllable according to the command.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
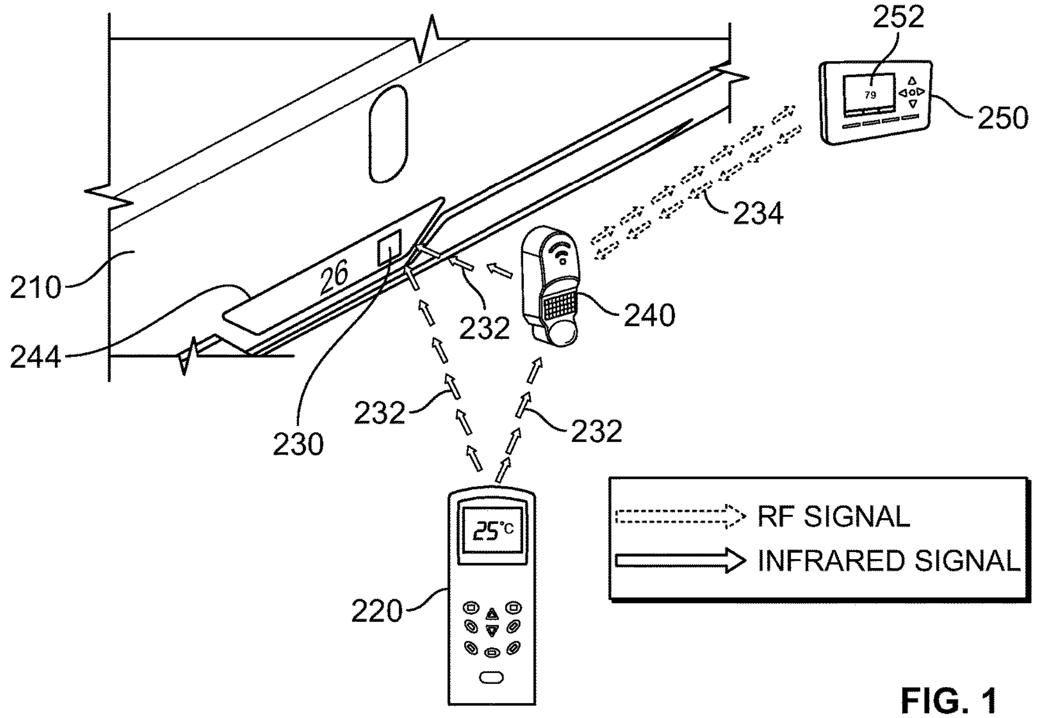
FIG. 1 illustrates exemplary communication paths or flows between various components of a split HVAC system and a radio frequency (RF) transceiver in accordance with an exemplary embodiment, where the RF transceiver is shown communicating (via two-way communications) with a control and communicating (via one-way communications) with an infrared (IR) receiver and IR handheld remote control.

Example embodiments will now be described more fully with reference to the accompanying drawings.

In a split HVAC system, the indoor unit typically includes an onboard controller. A programmable thermostat may be configured to communicate with the onboard controller of the indoor unit. A wireless handheld remote control may be used to control the indoor unit, such as to program an operational set point for the indoor unit and/or to establish an operating mode for the indoor unit, e.g., on, off, heat, or cool.

With conventional multi-split HVAC systems having multiple ductless indoor units, the inventor hereof has recognized that each indoor unit is isolated and individually controlled via its own onboard controller. The inventor has also recognized that conventional single-split and multi-split HVAC systems do not have connectivity to services beyond the immediate structure, such as connectivity to the Internet and/or to smart energy or utility meters. Without such connectivity, conventional split HVAC systems are thus also not controllable via the Internet or via a smart meter.

Accordingly, the inventor hereof has developed and discloses herein exemplary embodiments of systems and methods for providing such connectivity to a split HVAC system, to thereby allow the split HVAC system to be connected to (and also controllable via) the Internet and/or a smart utility meter. As disclosed herein, the inventor's exemplary embodiments include a device configured to provide connectivity to the Internet and/or to smart meters, where the device is operable for bridging communications between one or more existing receivers (e.g., infrared receivers, etc.) of one or more indoor units and the Internet and/or a smart utility meter. The device may also be referred to herein as a bridge device, radio frequency (RF) transceiver, equipment interface unit or module, etc.

In an exemplary embodiment, a bridge device includes an intermediate radio frequency (RF) transceiver that simulates an existing infrared handheld remote controller's output. The RF transceiver includes a port (e.g., an infrared port, etc.) for sending commands or instructions to the onboard controller, etc. of the indoor unit(s) for controlling, e.g., changing, operation of the one or more outdoor units of the split HVAC system. Also in this exemplary embodiment, the RF transceiver is operable for communicating (two-way or bi-directional communications) with a thermostat or other controller, e.g., a programmable thermostat, zone control (e.g., zone control without an internal temperature sensor, etc.), etc. For example, the RF transceiver may communicate bi-directionally with a zone control or zone controller such that the RF transceiver may transmit and receive signals to/from the zone control (e.g., by using ZigBee Smart Energy communication protocol and/or Wi-Fi, etc.). The RF transceiver may also communicate with a conventional handheld infrared controller. For example, the RF transceiver may receive (but not send) signals (one-way communications) from the conventional handheld infrared controller. The RF transceiver may also be configured for one-way communication with one or more existing infrared receivers of the one or more indoor units, such that the RF transceiver may send (but not receive) signals to the infrared receiver(s). Accordingly, the RF transceiver can receive signals from the handheld infrared controller and then send those received signals to the infrared receiver. In some embodiments, the handheld infrared controller may also be used to send signals directly to an infrared receiver of an indoor unit, thus bypassing the RF transceiver. The thermostat (e.g., zone control, etc.) may be configured with connectivity to the Internet and/or a smart utility meter, such that the RF transceiver (and thus the indoor unit) is also connectable to the Internet and/or the smart utility meter via the connection to the thermostat. In this exemplary manner, connectivity to the Internet, to a smart utility meter, to smart energy thermostat, etc. may thus be provided without requiring or necessitating modifications for the receiver side of the split HVAC system.

Exemplary embodiments disclosed herein are operable to bridge the communication between infrared receivers of each indoor unit and a smart utility meter using an RF transceiver and a programmable control thermostat or zone controller, such that the HVAC system (e.g., and its multiple indoor units, etc.) can be controlled under a single controller. By providing connectivity to the Internet and/or smart utility meters, exemplary embodiments also allow control of HVAC systems using the Internet and/or the smart meters. For example, various units of an HVAC system may be controlled under a single controller, such that a user may easily change the operating mode, change temperature settings, turn the system on or off, etc. via the Internet.

With reference now to the figures, FIG. 1 illustrates exemplary communication paths or flows between various components of a split HVAC system and an equipment interface unit or module in accordance with exemplary embodiments. The split HVAC system may comprise a single-split HVAC system or a multi-split HVAC system including at least one outdoor unit and multiple indoor units. As shown in FIG. 1, the HVAC system includes an indoor unit 210 and an infrared handheld infrared control 220. An infrared receiver 230 is operable for receiving wireless control instructions for the indoor unit 210, e.g., from the remote control 220.

In this example embodiment shown in FIG. 1, the equipment interface unit or module comprises a radio frequency (RF) transceiver 240 configured for communicating (via two-way communications 234) with a zone control or controller 250. The transceiver 240 is also configured for communicating (via one-way communications 232) with the infrared (IR) receiver 230 and the IR handheld remote control 220. Accordingly, the zone controller 250 is operable for wirelessly controlling the indoor unit 210 via the transceiver 240, which communicates with both the zone controller 250 and the infrared receiver 230 to thereby bridge or provide a bridge between the zone controller 250 and the infrared receiver 230. In a multi-split HVAC system, each indoor unit 210 may be provided with a transceiver 240 to allow the zone controller 250 to communicate (and control operation thereof) with the indoor units 210 via the transceivers 240.

Continuing with this example embodiment, the transceiver 240 includes an emitter for sending instructions to an onboard controller of the indoor unit 210. The transceiver 240 also includes a collector for receiving instructions, e.g., from the handheld infrared remote control 220. In operation, the collector intercepts instruction signals from the handheld remote control 220 and may countermand the instruction, e.g., if contrary to an instruction from the zone controller 250. For example, if the instruction from the zone controller 250 indicates that the indoor unit 210 should be OFF while the instruction from the handheld remote control 220 indicates that the indoor unit 210 should be ON, then the transceiver 240 may receive via its collector the ON instruction from the handheld remote control 220 and send its own OFF instruction to the indoor unit 210 via its emitter so that the indoor unit 210 will maintain the OFF state as programmed by the zone controller 250.

The infrared receiver 230 is operatively coupled (e.g., installed, onboard, etc.) with the indoor unit 210. By way of example, the infrared receiver 230 may be the OEM infrared receiver that was originally built into or onboard the indoor unit 210. In operation as shown in FIG. 1, the transceiver 240 communicates with the zone controller 250 via RF signals 234 and communicates with the infrared receiver 230 via infrared signals 232. Also, the handheld remote control 220 communicates with the transceiver 240 or directly with the infrared receiver 230 via infrared signals 232.

The zone controller 250 has a display device 252 (e.g., liquid crystal display (LCD) device, a touch screen, etc.) for displaying status information (e.g., 79 degrees Fahrenheit in FIG. 1, etc.) for the HVAC system. This, in turn allows for convenient monitoring of the status of the HVAC system, such as current temperature, set point temperature, etc. The indoor unit 210 also includes a display device 244 (e.g., liquid crystal display (LCD) device, a touch screen, etc.) for displaying status information (e.g., 26 degrees Celsius in FIG. 1, etc.) for the indoor unit 210. This, in turn, allows for convenient monitoring of the status of the indoor unit 210 such as current temperature, set point temperature, etc.

By way of example, the zone controller 250 may be powered by one or more batteries and by a power stealing technique which supplements the one or more batteries. As another example, the zone controller 250 may be continuously powered by line voltage.

Figure 2:
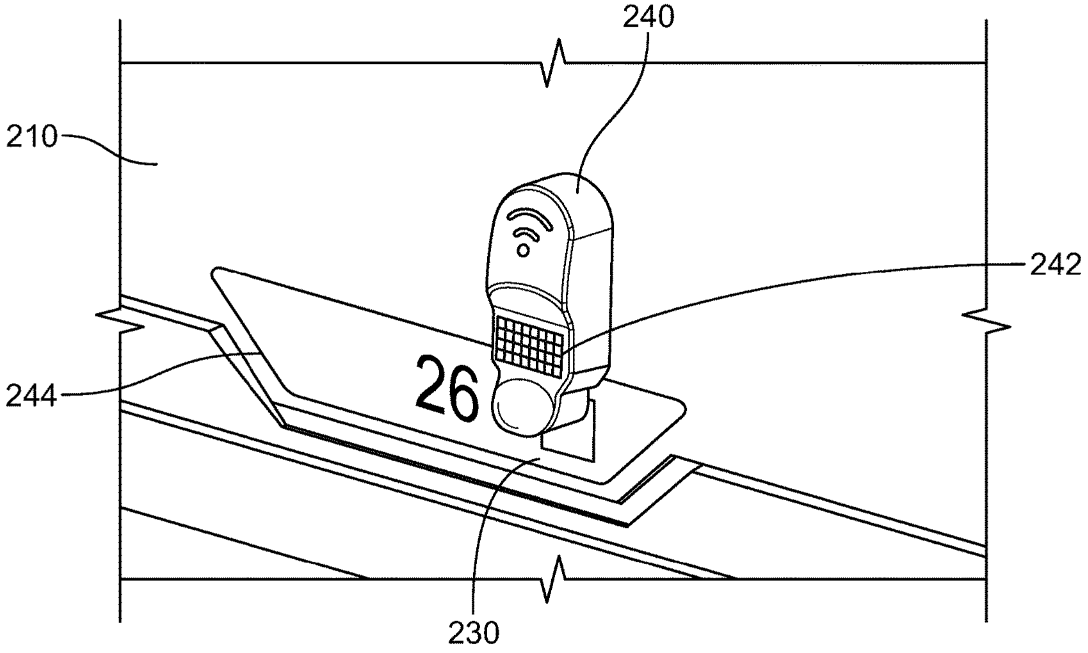
FIG. 2 is a perspective view of the RF transceiver shown in FIG. 1 mounted or installed on the indoor unit of the split HVAC system.

FIG. 2 shows the transceiver 240 mounted or installed (e.g., adjacent the OEM infrared receiver 230, etc.) on or to the indoor unit 210. The indoor unit 210 may be controlled by the remote control 220 via the infrared receiver 230 or via the transceiver 240 as an intermediary between the remote control 220 and infrared receiver 230. For example, the remote control 220 may be used to set or program a set point temperature (e.g., 25 degrees Celsius shown in FIG. 2, etc.) and/or change the operating mode of the indoor unit, e.g., turn it on or off, change to a heat or cool cycle, etc. The indoor unit 210 may also be controlled via the zone controller 250 through the transceiver 240. In this example, the transceiver 240 includes a solar power supply (e.g., solar panel 242 in FIG. 2, etc.) which charges one or more rechargeable batteries or capacitors of the transceiver 240 by light. This, in turn, helps extend the operational life of the transceiver. Alternative embodiments may include a transceiver having a different power source configuration.

Figure 3:
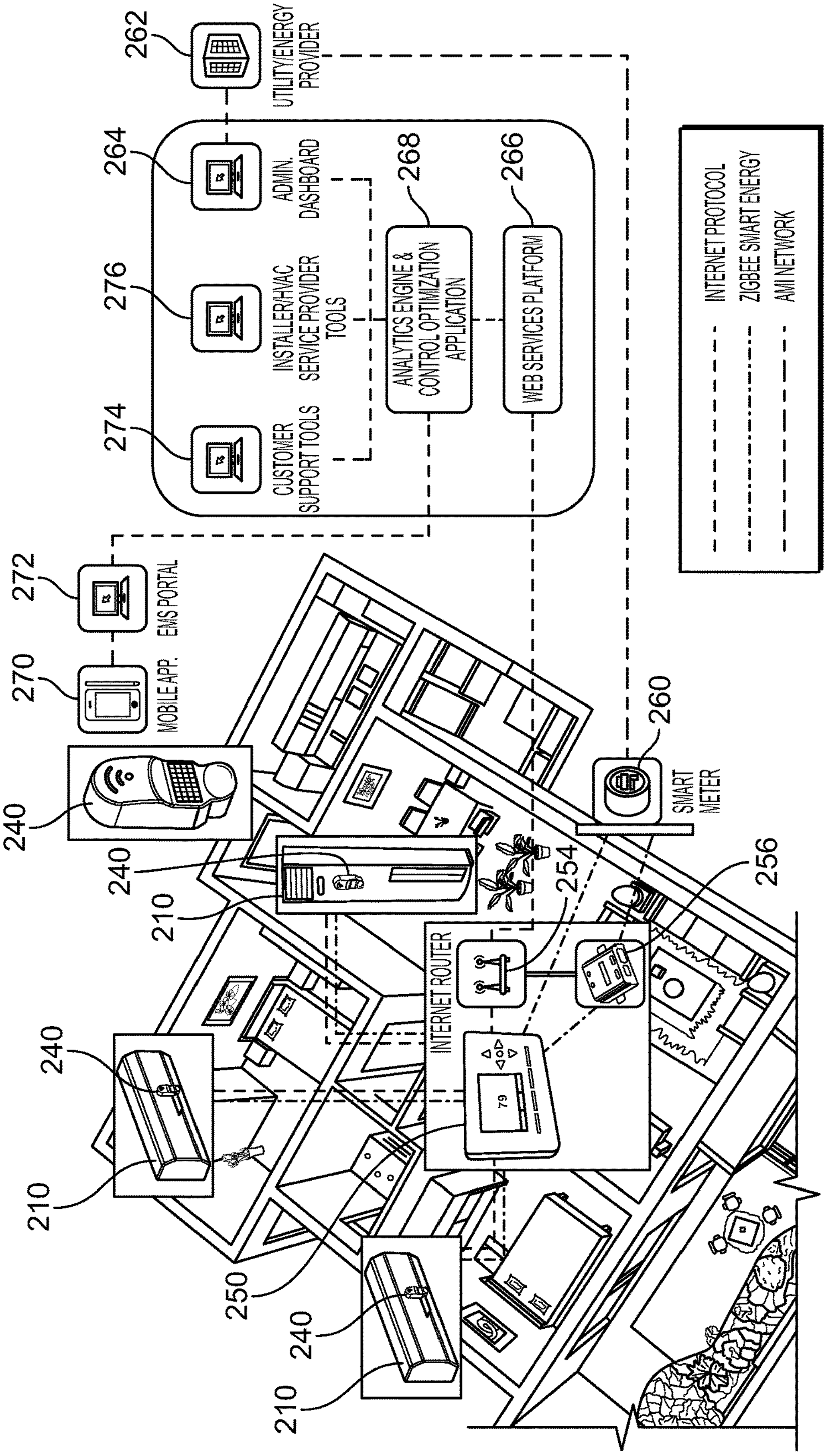
FIG. 3 illustrates a system architecture according to an exemplary embodiment.

FIG. 3 illustrates an exemplary embodiment of a system architecture embodying one or more aspects of the present disclosure. In this exemplary embodiment, multiple indoor units 210 are controllable by the single common zone controller 250 via transceivers 240 and receivers 230 of the indoor units 210. Each indoor unit 210 includes a receiver 230 and is also provided with a transceiver 240, which is located relative to (e.g., adjacent, etc.) the receiver 230 for communication therewith. For example, a transceiver 240 may be mounted or installed (e.g., adhesively attached, bonded to a surface, etc.) on the indoor unit 210 adjacent to the indoor unit's receiver 230. The transceiver 240 is also located relative to the zone controller 250 for communication therewith. Accordingly, the indoor units 210 are thus controllable via the zone controller 250, which communicates (e.g., sends commands, instructions, etc.) with the indoor units 210 via the transceivers 240 that operate as intermediaries or bridge devices that convey or transfer communications from the zone controller 250 to the receivers 230 of the indoor units 210. The transceivers 240 may communicate with the zone controller 250 via any suitable means. For example, FIG. 3 shows that the transceivers 240 and zone controller 250 communicate by using ZigBee Smart Energy communication protocol and/or Wi-Fi, etc. In a preferred embodiment, the transceivers 240 and zone controller 250 communicate by using ZigBee low power wireless communication using Smart Energy profile.

With continued reference to FIG. 3, the zone controller 250 is configured with connectivity to allow connection with a smart meter 260 and with the Internet. As shown, the zone controller 250 may be connected (e.g., via Wi-Fi, etc.) to the Internet via a router 254 using the Internet Protocol (IP). The zone controller 250 may also be connected (e.g., using ZigBee Smart Energy communication protocol, etc.) directly to the smart meter 260 and/or indirectly to the smart meter via a modem 256.

Continuing with this example, the smart meter 260 may be connected (e.g., using AMI Network, etc.) to an energy or utility provider 262. The utility/energy provider 262 may also be connected to an Administrative Dashboard 264 via the Internet. Accordingly, the utility/energy provider 262 may send instructions, requests and/or commands to the zone controller 250, such as a request for reduced operation or energy reduction to thereby have the zone controller 250 respond accordingly, e.g., discontinue use of one or more of the indoor units 210, etc.

Also shown in FIG. 3 is a Web Services Platform 266 that is connectable to the zone controller 250 via the Internet through the router 254. Various applications and/or tools may be accessible to a user and/or the utility/energy provider 262 via the Internet. For example, an Analytics Engine and Control Optimization Application 268 connected and accessible via the Web Services Platform 266. Also shown are a mobile app 270 (e.g., an iPhone® app, an iPad® app, an Android® app, etc.), Portal 272, Customer Support Tools 274, and Installer/HVAC Service Provider Tools 276. Accordingly, a user can wirelessly, remotely control operation of the indoor units 210 via the connection of the zone controller 250 to the Internet, such as to change the operating mode (e.g., heat, cool, on, or off), adjust temperature, etc. The utility/energy provider 262 may also wirelessly, remotely control operation of the indoor units 210 through the smart meter 260.

In an exemplary embodiment, a zone controller 250 has programmed schedules and set point temperatures for each remote zone, which schedules and set point temperatures may be the same or different for the various zones. In this example, indoor units 210 may each include their own thermostat and internal temperature sensor (e.g., thermistor, etc.) as part of its built-in control. The zone controller 250 does not include a temperature sensor in this example. In operation, the temperature sensor of each indoor unit 210 senses the current indoor temperature for its respective zone. Then, the onboard control of each indoor unit 210 compare the sensed temperature for its zone with the set point temperature it received from the zone controller 250 via the transceiver 240. This comparison is used by the onboard controller of the indoor unit 210 to command and operate the indoor unit 210 as a function of the comparison, e.g., to determine whether to turn ON or OFF the indoor unit 210 or to determine whether to enter a heat cycle or cool cycle.

In another exemplary embodiment, the zone controller 250 includes a temperature sensor. In this example, the zone controller 250 sends sensed temperature to the equipment interface modules or units (e.g., transceivers 240, etc.). The equipment interface units compares a set point temperature (e.g., stored in its local memory, etc.) with the sensed temperature received from the zone controller 250. This comparison is then used by the equipment interface units to determine the commands, instructions, etc. to send to the indoor unit 210 for operating the indoor unit 210 as a function of the comparison, e.g., to determine whether to turn ON or OFF the indoor unit 210 or to determine whether to enter a heat cycle or cool cycle.

Aspects of the present disclosure also relate to exemplary operating processes or methods for controlling a split HVAC system according to an exemplary embodiment. In an example method, instructions are initially set or programmed for the operation of the one or more indoor units of the split HVAC system. These instructions may be set, for example, by a user (e.g., homeowner, etc.) entering the instructions via a programmable thermostat or a zone control (e.g., zone controller 250, etc.) or via the Internet by accessing an application, tool, platform, etc. The instructions may also or alternatively be set by a utility/energy provider via a smart meter (e.g., smart meter 260, etc.). When the instructions are set via the Internet or via a smart meter, the instructions are conveyed, transmitted, or communicated to the zone controller. The zone controller, in turn, conveys, transmits, or communicates the instructions to an equipment interface unit or module (e.g., via RF signals to an RF transceiver 240, etc.). The equipment interface unit converts the instructions to an appropriate command for the indoor unit and conveys, transmits, or communicates the command to the indoor unit (e.g., via infrared signals to a receiver 230 of an indoor unit 210, etc.). The receiver then conveys, transmits, or communicates the command to the indoor unit.

Aspects of the present disclosure also relate to exemplary embodiments of methods for comparing a sensed temperature with a set point temperature for turning on or off the system, changing an operating mode, etc. In an example method, a zone control (e.g., zone controller 250, etc.) conveys, transmits, or communicates a set point temperature to an equipment interface unit or module (e.g., an RF transceiver 240, etc.), which may store the set point temperature in a local member. The equipment interface unit may include a temperature sensor that senses the temperature of the zone, room, or interior space in which the equipment interface unit and indoor unit is located. Alternatively, the equipment interface unit may receive a sensed temperature from a remote temperature sensor, e.g., a temperature sensor internal to or an onboard thermostat of an indoor unit, a temperature sensor internal to the zone control, etc. The equipment interface unit compares the sensed temperature with the set point temperature received from the zone controller. If the sensed temperature is higher than the set point temperature, the equipment interface unit conveys, transmits, or communicates an ON command to the indoor unit (e.g., via IR signal to an IR receiver 230, etc.) to start a cool cycle or a command to change from a heat cycle to a cool cycle. If the sensed temperature is lower than the set point temperature, the equipment interface unit conveys, transmits, or communicates an OFF command to the indoor unit to stop the cool cycle and/or a command to change from the cool cycle to a heat cycle.

In another exemplary embodiment of a method, a temperature sensor in a zone control senses the temperature of the inside space. The zone control conveys, transmits, or communicates the sensed temperature to an equipment interface unit or module (e.g., an RF transceiver 240, etc.). The equipment interface unit compares a set point temperature (e.g., stored in a local memory, etc.) with the sensed temperature received from the zone control. If the sensed temperature is higher than the set point temperature, the equipment interface unit conveys, transmits, or communicates an ON command to the indoor unit (e.g., via IR signal to an IR receiver 230, etc.) to start a cool cycle or a command to change from a heat cycle to a cool cycle. If the sensed temperature is lower than the set point temperature, the equipment interface unit conveys, transmits, or communicates an OFF command to the indoor unit to stop the cool cycle and/or a command to change from the cool cycle to a heat cycle.

Accordingly, exemplary aspects of the present disclosure are directed towards a common control for a multi-split HVAC system (ductless system), in which a single device is able to replace the individual indoor unit controls which are typically provided with a ductless system. The indoor unit typically has a wireless remote control which is used to program an operational set point for the unit and to establish the operating mode, e.g., heat, cool, on, or off. In exemplary embodiments, a common control (e.g., programmable thermostat, zone control, etc.) is installed in a centralized or central location of a home, apartment, etc. The control communicates wirelessly to an equipment interface unit, module, or device that is attached to an indoor unit of the HVAC system. The interface module (e.g., RF transceiver, etc.) receives a wireless command from the control and then converts the command into the appropriate command for the indoor unit. The indoor unit is configured to receive instructions via an IR signal. The OEM (original equipment manufacturers) handheld wireless remote control units typically use an IR communication scheme for programming of the indoor unit. Thus, the interface module is configured to use the same method to transmit commands to the indoor unit as the OEM remote control. The interface module may thus have to "learn" the specific command sets of a specific ductless system in which it is being used.

In addition to being able to send commands to one or more indoor units, the control is also configured (e.g., has an antenna, radio, etc.) for connection to the Internet and/or a smart meter. This enables a user to remotely access the settings in the control (e.g., set or change the settings, etc.). This also or alternatively enables a utility provider (e.g., energy company, etc.) to send a command for energy reduction to the control, to thereby have the control respond accordingly, e.g., discontinue use of the ductless HVAC system, etc.

The control itself may be powered by a power stealing technique, which may supplement one or more batteries. Or, the control may be continuously powered by line voltage. The interface module (e.g., RF transceiver, etc.) may have a solar power supply, which charges one or more batteries or capacitors to extend operational life.

Exemplary embodiments disclosed herein may be configured with the ability to allow a control (e.g., programmable thermostat, zone control, control with or without an internal temperature sensor, etc.) to operate multiple units of a ductless system, such as a ductless system having one outdoor compressor and multiple indoor units or a ductless system having two or more indoor units each with its own outdoor unit. Accordingly, exemplary embodiments may thus provide connectivity to the Internet and/or to a smart utility meter, remote access, and/or multiple unit control capability.

Exemplary embodiments may include equipment interface modules having separate infrared emitters and collectors. The emitter is operable for sending instructions to the onboard control of an indoor unit via the IR protocol. The collector is operable to intercept and countermand signals from a handheld IR remote control, e.g., an OEM remote control that originally came with a ductless unit. For example, if the control has indicated the ductless unit should be off, the user might be able to override that OFF command using a local handheld IR remote control. In exemplary embodiments, however, an equipment interface module is configured to sense via its collector the ON command from the IR handheld remote control unit, and then immediately send its own OFF signal via its IR emitter to maintain the programmed OFF state.

In an exemplary embodiment the control is a zone control that does not have an internal temperature sensor. Because each indoor unit in a ductless system typically has its own thermostat and temperature sensor as part of its built-in control. Therefore, the zone control does not also need an internal temperature sensor. The zone control may be operable to maintain a programmed schedule (e.g., wake, leave, return, sleep or home, sleep, away, etc.), the set point temperature for each remote zone, and the state (ON or OFF) for each remote zone. Then, the onboard controllers in each of the indoor units would use this set point information to determine when to turn on and off. The indoor unit controller may have a set point and dead band around the set point, which is used to determine whether to enter a heat or cool cycle.

In an exemplary embodiment, there may be a temperature sensor in the equipment interface unit or module. The equipment interface unit may be configured and be operable to compare a stored set point (received from the zone control) to a sensed temperature received from its own temperature sensor. When the sensed temperature is beyond a first predetermined amount (e.g., 1.5° F., etc.) of the stored set point temperature, the equipment interface unit may the send an ON command to the onboard control of the indoor unit. When the sensed temperature is within a second predetermined amount (e.g., 0.5° F., etc.) of the stored set point temperature, the equipment interface unit sends an OFF command to the onboard control of the indoor unit.

Another exemplary embodiment includes a zone control having a temperature sensor. In this example, the zone control is operable for sending the sensed temperature to each of the interface units installed to the indoor units of the HVAC system. Each interface unit may then compare the value of the sensed temperature it received from the zone control to a stored set point, and then command the indoor unit (to which it is installed) as a function of the comparison. Accordingly, this exemplary embodiment thus makes use of the inherent control abilities of the indoor unit onboard controllers.

In an exemplary embodiment, the equipment interface unit or module comprises an RF transceiver configured for two-way communications with a programmable control thermostat and configured for one-way communication with an existing infrared receiver of an indoor unit. A homeowner may still use the OEM remote control, e.g., as shown in FIG. 1. The RF transceiver may pass the homeowner's air conditioning usage pattern to the programmable control thermostat. The programmable control thermostat may transfer the information to a web service platform via the Internet. Background software may control optimization automatically. And, if the house already has a smart meter installed, the programmable control thermostat may also perform demand response load control through the RF transceiver.

Exemplary embodiments disclosed herein may provide one or more (but not necessarily any or all) of the following advantages. For example, exemplary embodiments disclosed herein include devices operable to convert a collection of single unitary ductless units into a zoned system under the control of a single thermostat. Also in exemplary embodiments, such devices may also be used to make the converted zoned system available for control via the Internet, a smart energy meter, etc. With exemplary embodiments, an HVAC system may thus be controlled remotely with a smart meter and/or over the Internet, e.g., by a home owner or other user using a computer or Internet-enabled portable device, such as a smart phone, laptop, tablet, Blackberry® device, Android® device, an iPhone® device, iPad® tablet, etc.

Also by way of example, exemplary embodiments may enable connection of an infrared controlled air conditioner to a smart energy application (e.g., demand response/load control (DRLC), etc.) and/or may enable a homeowner to remotely control the HVAC system via a portable communication device (e.g., smart phone or device mentioned above, etc.), a personal computer, etc. Exemplary embodiments may enable a service software company to optimize home owner's energy consumption and comfort level. Also, exemplary embodiments may allow a service provider for the HVAC system to remotely optimize the system with the proper software and/or software update, etc. Exemplary embodiments may be easily installed or retrofitted as a simple add-on without having to cut wiring during installation. Exemplary embodiments may include an RF transceiver with a solar panel such that the RF transceiver has a relatively long lasting life. Exemplary embodiments may not require or need a homeowner to run the learning routine for the RF transceiver to learn the infrared remote controller. The work can be done via a computer or other device because the service platform can find homeowner's infrared remote controller's type and automatically download to the RF transceiver.

Exemplary embodiments disclosed herein may be used with various configurations of HVAC systems. By way of example, exemplary embodiments may be used with single-split systems or multi-split HVAC systems, such as a ductless system with one outdoor unit/compressor and multiple indoor units, a ductless system with two or more indoor units each with its own outdoor unit, a unitary ductless air conditioning or heat pump system with one outdoor unit and one indoor unit programmed by an infrared handheld unit, single-split wall-mounted air conditioner, single-split heat pump system, window room air conditioner, etc. Exemplary embodiments may also be used with a forced air system. For example, an exemplary embodiment includes a thermostat for a forced air system, where the thermostat has a zone control provision to enable the control of a remote ductless system such as a single-split system or a window air conditioner.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use with a split HVAC system including at least one outdoor unit and a plurality of indoor units, each indoor unit having an infrared receiver, the system comprising:

a control having connectivity to a network and/or a smart utility meter; and a plurality of equipment interface modules, each of the plurality of equipment interface modules mounted on a corresponding one of the plurality of indoor units adjacent to the infrared receiver of the corresponding one of the plurality of indoor units while leaving at least a portion of said infrared receiver visually unobstructed to receive infrared signals directly from a handheld infrared remote control, each of the plurality of equipment interface modules configured for one-way wireless communication with the infrared receiver of the corresponding one of the plurality of indoor units and two-way wireless communication with the control, such that each of the plurality of equipment interface modules is operable for communicating instructions from the control to the infrared receiver of the corresponding one of the plurality of indoor units while also allowing the infrared receiver to receive infrared signal instructions directly from the handheld infrared remote control, thereby allowing operation of the corresponding indoor unit to be controllable via the network and/or smart utility meter, and the handheld infrared remote control;

wherein each of the plurality of equipment interface modules comprises a collector for intercepting contrary instructions from the handheld infrared remote control of the corresponding one of the plurality of indoor units, to thereby allow each of the plurality of equipment interface modules to countermand the contrary instructions by sending an instruction to the infrared receiver after receiving the contrary instruction from the handheld infrared remote control via the collector.

2. The system of claim 1, wherein:

the control is configured with connectivity to the Internet, such that operation of each of the plurality of indoor units is controllable by a user via the Internet when the control is connected to the Internet; and/or the control is configured with connectivity to a smart utility meter such that operation of each of the plurality of indoor units is controllable by a utility provider via the smart utility meter when the control is connected to the smart utility meter.

3. The system of claim 1, wherein:

each of the plurality of equipment interface modules is operable for communicating instructions from the control via infrared signals to the infrared receiver of the corresponding indoor unit; and/or each of the plurality of equipment interface modules comprises a radio frequency transceiver configured for communication with the control via radio frequency signals.

4. The system of claim 1, wherein:

each of the plurality of equipment interface modules is configured for bi-directional communication with the control via sending and receiving radio frequency signals to/from the control; and each of the plurality of equipment interface modules is configured for unidirectional communication with the infrared receiver of the corresponding indoor unit by sending infrared signals to the infrared receiver.

5. The system of claim 1, wherein each of the plurality of equipment interface modules is configured to be operable as a communications bridge between the control and the infrared receiver of the corresponding one of the plurality of indoor units, whereby each of the plurality of equipment interface modules is operable for converting instructions from the control to appropriate commands for the corresponding one of the plurality of indoor units.

6. The system of claim 1, wherein each of the plurality of equipment interface modules comprises:

an emitter for sending instructions from the control to the infrared receiver of the corresponding one of the plurality of indoor units, which instructions are for an onboard controller of the corresponding one of the plurality of indoor units.

7. The system of claim 1, wherein the control comprises a zone control having one or more programmed schedules and set point temperatures for each of a plurality of zones in which is located a corresponding one of the plurality of indoor units, the plurality of indoor units belonging to a multi-split HVAC system.

8. The system of claim 7, wherein each of the plurality of equipment interface modules is operable for comparing a sensed temperature of the zone in which it is located with a set point temperature and for sending an appropriate command to the indoor unit in that zone.

9. The system of claim 7, wherein:

the zone control includes a temperature sensor, and the zone control is operable for sending the sensed temperature to the plurality of equipment interface modules; and/or each of the plurality of equipment interface modules includes a temperature sensor and is operable for comparing the temperature sensed thereby with a set point temperature from the zone control; and/or each of the plurality of indoor units includes a temperature sensor and an onboard controller operable for comparing a sensed temperature from the temperature sensor with a set point temperature from the zone control.

10. The system of claim 1, wherein:

the control comprises a zone control operable for controlling operation of all of the plurality of indoor units by communicating with each of the plurality of equipment interface modules and the receiver of each indoor unit.

11. The system of claim 10, wherein:

the zone control is configured with connectivity to the Internet, such that operation of all of the indoor units is controllable by a user via the Internet when the zone control is connected to the Internet; and/or the zone control is configured with connectivity to a smart utility meter such that operation of all of the indoor units is controllable by a utility provider via the smart utility meter when the zone control is connected to the smart utility meter.

12. A multi-split HVAC system comprising:

at least one outdoor unit;

a plurality of indoor units each having an infrared receiver;

a zone control;

a plurality of radio frequency transceivers, each of which is configured for two-way communication with the zone control via radio frequency signals and for one-way communication with a corresponding one of the infrared receivers via infrared signals, and is mounted on the one of the plurality of indoor units having the corresponding one of the infrared receivers, adjacent to the corresponding one of the infrared receivers while leaving at least a portion of said corresponding one of the infrared receivers visually unobstructed to receive infrared signals directly from a handheld infrared remote control, whereby the radio frequency transceivers are operable for communicating instructions from the zone control to the infrared receivers while also allowing the infrared receiver to receive infrared signal instructions directly from the handheld infrared remote control, thereby allowing operation of all of the indoor units to be controllable by the zone control and the handheld infrared remote control;

wherein each of the plurality of radio frequency transceivers comprises a collector for intercepting contrary instructions from the handheld infrared remote control of the corresponding one of the plurality of indoor units, to thereby allow each of the plurality of equipment interface modules to countermand the contrary instructions by sending an instruction to the infrared receiver after receiving the contrary instruction from the handheld infrared remote control via the collector.

13. The multi-split HVAC system of claim 12, wherein:

the zone control is configured with connectivity to the Internet, such that operation of all of the plurality of indoor units is controllable by a user via the Internet when the zone control is connected to the Internet; and/or the zone control is configured with connectivity to a smart utility meter such that operation of all of the plurality of indoor units is controllable by a utility provider via the smart utility meter when the zone control is connected to the smart utility meter.

14. The system of claim 12, wherein each radio frequency transceiver is configured to communicate with the zone control via two-way communication, and each radio frequency transceiver is configured to simulate the output of the infrared handheld remote control.

15. The system of claim 12, wherein each radio frequency transceiver is mounted to a different one of the multiple indoor units adjacent the infrared receiver of said one of the multiple indoor units.

16. The system of claim 12, wherein the zone control is configured with connectivity to a smart utility meter such that operation of all of the multiple indoor units is controllable by a utility provider via the smart utility meter when the zone control is connected to the smart utility meter.

17. A method for wirelessly, remotely controlling a split HVAC system having at least one outdoor unit, multiple indoor units each having an infrared receiver, and multiple equipment interface modules each configured for one-way communication with a corresponding one of the multiple indoor units and mounted to the corresponding one of the multiple indoor units adjacent the infrared receiver of the corresponding one of the multiple indoor units while leaving at least a portion of said infrared receiver visually unobstructed to receive infrared signals directly from a handheld infrared remote control, each of the plurality of equipment interface modules comprising a collector for intercepting contrary instructions from the handheld infrared remote control of the corresponding one of the plurality of indoor units, to thereby allow each of the plurality of equipment interface modules to countermand the contrary instructions by sending an instruction to the infrared receiver after receiving the contrary instruction from the handheld infrared remote control via the collector, the method comprising:

remotely setting an instruction for at least one of the multiple indoor units via a network, a smart meter, or a zone control;

wirelessly transmitting the instruction to the corresponding one of the multiple equipment interface modules that converts the instruction to a command for the at least one indoor unit;

wirelessly receiving, at the infrared receiver of the at least one indoor unit, an infrared signal directly from a handheld infrared remote control; and wirelessly transmitting the command to the infrared receiver of the at least one indoor unit, whereby operation of the at least one indoor unit may be controllable according to the command and/or the infrared signal from the handheld infrared remote control received directly at the infrared receiver of the at least one indoor unit.

18. The method of claim 17, wherein the method includes:

a user remotely setting an instruction for the at least one of the multiple indoor units via zone control or the Internet connected to the zone control; and/or a utility provider remotely setting an instruction for the at least one of the multiple indoor units via the smart meter connected to the zone control; and/or the zone control wirelessly transmitting the instruction to at least one of the multiple equipment interface modules.

19. The method of claim 17, wherein:

wirelessly transmitting the instruction to the corresponding one of the multiple equipment interface modules comprises wirelessly transmitting radio frequency signals to a radio frequency transceiver; and wirelessly transmitting the command to the infrared receiver comprises wirelessly transmitting infrared signals to the infrared receiver of the at least one of the multiple indoor units.

20. The method of claim 17, wherein:

wirelessly transmitting the instruction to the corresponding one of the multiple equipment interface modules comprises wirelessly transmitting the instructions to the multiple equipment interface modules; and wirelessly transmitting the command to the infrared receiver of the at least one of the multiple indoor units comprises wirelessly transmitting the command to the infrared receiver of each of the multiple indoor units, such that operation of all of the multiple indoor units is controllable by the zone control.

* * * * *